United States Patent
Fernandez-Corbaton et al.

(10) Patent No.: US 7,085,537 B2
(45) Date of Patent: Aug. 1, 2006

(54) SYSTEM AND METHOD FOR THE DETECTION AND COMPENSATION OF RADIO SIGNAL TIME OF ARRIVAL ERRORS

(75) Inventors: Ivan J. Fernandez-Corbaton, San Diego, CA (US); Roland Rick, San Diego, CA (US); Messay Amerga, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/932,511

(22) Filed: Sep. 1, 2004

(65) Prior Publication Data
US 2005/0032477 A1 Feb. 10, 2005

Related U.S. Application Data

(63) Continuation of application No. 09/879,074, filed on Jun. 11, 2001, now Pat. No. 6,804,494.

(51) Int. Cl.
*H04B 1/00* (2006.01)

(52) U.S. Cl. .................................. 455/65; 455/506
(58) Field of Classification Search ............ 455/456.1, 455/456.6, 63.1, 65, 506, 504; 342/357.01–357.06, 342/357.1, 450
See application file for complete search history.

(56) References Cited

U.S. PATENT DOCUMENTS

| | | | |
|---|---|---|---|
| 6,198,765 B1 * | 3/2001 | Cahn et al. | 375/142 |
| 6,542,754 B1 * | 4/2003 | Sayers et al. | 455/502 |
| 6,804,494 B1 * | 10/2004 | Fernandez-Corbaton et al. | 455/65 |

* cited by examiner

*Primary Examiner*—Lee Nguyen
(74) *Attorney, Agent, or Firm*—Philip Wadsworth; Bruce Greenhaus; James McFarland

(57) ABSTRACT

A system and method are disclosed by which the effects of time of arrival errors may be reduced. In a mobile unit, such as a CDMA device, a correlation pulse is generated when a transmitted code matches a stored reference code. In the absence of multipath effects, correlation pulses are generated in response to the detection of multiple transmissions of the reference code from multiple transmitters. However, multipath effects distort the generated correlation pulses leading to errors in the time of arrival measurements. The present invention calculates the width of the correlation pulses and determines a delay correction factor based on the pulse width. The delay correction factor is added to the measured delay time to provide a more accurate delay time, thus permitting more accurate location measurements based on time of arrival. In alternative embodiments, other signal factors may also be used to apply delay correction factors. The actual location determination may be performed by the mobile unit, or any other positioning determining entity (PDE). The system is also capable of applying correction factors to time of arrival signals received from global positioning system (GPS) satellites.

13 Claims, 7 Drawing Sheets

SYSTEM AND METHOD FOR THE DETECTION AND COMPENSATION OF RADIO SIGNAL TIME OF ARRIVAL ERRORS

RELATED APPLICATIONS

This application is a continuation of U.S. patent application Ser. No. 09/879,074, filed on Jun. 11, 2001, now U.S. Pat. No. 6,804,494, issued Oct. 12, 2004.

FIELD OF THE INVENTION

The present invention is related generally to telecommunications and, more specifically, to a technique for detecting and compensating for time of arrival errors in a telecommunications system.

BACKGROUND OF THE INVENTION

Emergency services are often requested using telephone numbers, such as "911." If the caller is in a fixed location, such as a residence, computer systems track the telephone number of an incoming telephone call using automatic number identification (ANI) and quickly determine the address from which the call originated. Thus, it is a relatively simple task to determine the location from which emergency services are requested.

The location of a user requesting emergency service requests via mobile communications, such as cellular telephones, personal communication systems (PCS) devices and the like, is not as easily determined. Radio triangulation techniques have long been used to determine the location of a mobile unit. However, such radio triangulation techniques are known to be inherently inaccurate. Errors on the order of thousands of meters are not uncommon. However, such errors are unacceptable for the delivery of emergency services.

The Federal Communications Commission (FCC) has ordered changes in communication technology that will permit greater accuracy in location determination. In the case of mobile communications, the FCC has generated a rule that requires infrastructure based location systems to have an accuracy of 150 meters 67% of the time (and an accuracy of 300 meters 95% of the time). For systems that require modified handsets, the FCC has decreed that such systems must determine location within 50 meters 67% of the time (and 150 meters 95% of the time).

Radio location systems use time of arrival (TOA) signals coming from different transmitters of known positions to triangulate and estimate the mobile unit location. However, time of arrival signals are often distorted or erroneous due to multiple transmission paths. FIG. 1 illustrates an example of multiple transmission paths that may be experienced by a mobile phone in a vehicle 10. In the example illustrated in FIG. 1, the mobile unit 10 is receiving signals from transmitters 12 and 14 mounted atop towers. In the example of FIG. 1, the mobile unit 10 receives a signal directly from the transmitters 12 and 14, but also receives signals from the transmitter 14 that have reflected off nearby buildings. Thus, the mobile unit 10 receives a number of signals from the transmitter 14. In the example illustrated in FIG. 1, the mobile unit 10 is not within the line of sight (LOS) of the transmitter 16. That is, buildings or other structures block the direct line of sight between the mobile unit 10 and the transmitter 16. However, the mobile unit 10 still detects signals from the transmitter 16 that are reflected off buildings or other structures or are defracted around edges of buildings or other structures. In addition, the mobile unit 10 receives signals from a transmitter 16 mounted atop a building and may also receive signals from a global positioning system (GPS) satellite 18 in orbit about the earth. As a result, the mobile unit 10 receives multiple signals from the transmitter 16, none of which are direct LOS signals. Signals from the GPS satellite 18 may also comprise LOS signals and reflected signals. As a result of such multipath signals, the time of arrival measurements by the mobile unit are subject to error. Such errors can be significant in the presence of multipath signals, thus making it difficult or impossible to achieve the FCC directives with regard to location accuracy. Therefore, it can be appreciated that there is a significant need for a system and method to improve TOA measurements for mobile location systems. The present invention provides this and other advantages that will be apparent from the following detailed description and accompanying figures.

SUMMARY OF THE INVENTION

The present invention is embodied in a system and method for correction of multipath errors in a telecommunication device location system. In one embodiment, the system comprises a receiver that receives data transmitted from a remote transmitter located at an unknown distance from the receiver. An analyzer analyzes the date associated with the received data and generates location data related to the location of the receiver. The analyzer also calculates a correction factor based on a measured signal criteria to generate corrected location data.

In one embodiment, the receiver generates a correlation pulse when the received data is correlated to stored data. In this embodiment, the signal criteria is the pulse width of the correlation pulse. The correlation pulse may be modeled as a quadratic equation having a plurality of coefficients that are determined by amplitude values of the correlation pulse at predetermined times. In another embodiment, the receiver generates a signal strength indicator. In this embodiment, the signal criteria is the signal strength indicator.

The system may further comprise a position determining entity to determine the location of the receiver based on the corrected location data and a known location of the remote transmitter. The location data may be based on the time of arrival of the data received by the receiver. The time of arrival data may be calculated as a delay time or distance and the correction factor may be calculated as a correction time or correction distance.

In one embodiment, the receiver is a portion of the cellular telephone operating in an 800 MHz band and the analyzer calculates the location data based on a time of arrival of data transmitted from the remote transmitter in the 800 MHz band. Alternatively, the receiver may be a portion of a personal communication system operating in a 1900 MHz band and the analyzer calculates the location data based on time of arrival of data transmitted from the remote transmitter in the 1900 MHz band.

In yet another alternative embodiment, the remote transmitter is a global positioning system (GPS) satellite and the receiver receives the data signals from the GPS satellite. In this embodiment, the analyzer calculates the location data based on the time of arrival of data transmitted from the GPS satellite.

The system may further include a data structure to store data relating a selected signal criteria to one or more correction factors, wherein the analyzer provides a measure of the selected data as an input to the data structure and retrieves a correction factor stored in association with the measure of the selected criteria. The system may alternatively include a data structure to store mathematical function relating the selected signal criteria to one or more correction factors, wherein the analyzer calculates the correction factor using the selected criteria in the mathematical function.

DETAILED DESCRIPTION OF THE PREFERRED EMBODIMENTS

The present invention permits a quantitative measure of distance errors introduced as a result of multipath signals and provides for a correction factor to be applied to the time of arrival measurement to allow more accurate location determination. In an exemplary embodiment, the present invention is implemented using portions of a conventional code division multiple access (CDMA) mobile unit. The CDMA mobile unit may be referred to as a mobile unit, cellular telephone, PCS device, or the like. As will be discussed in greater detail below, the present invention is not limited to a specific form of mobile communication device, nor is it limited to a specific frequency of operation of the mobile device.

Figure 2:
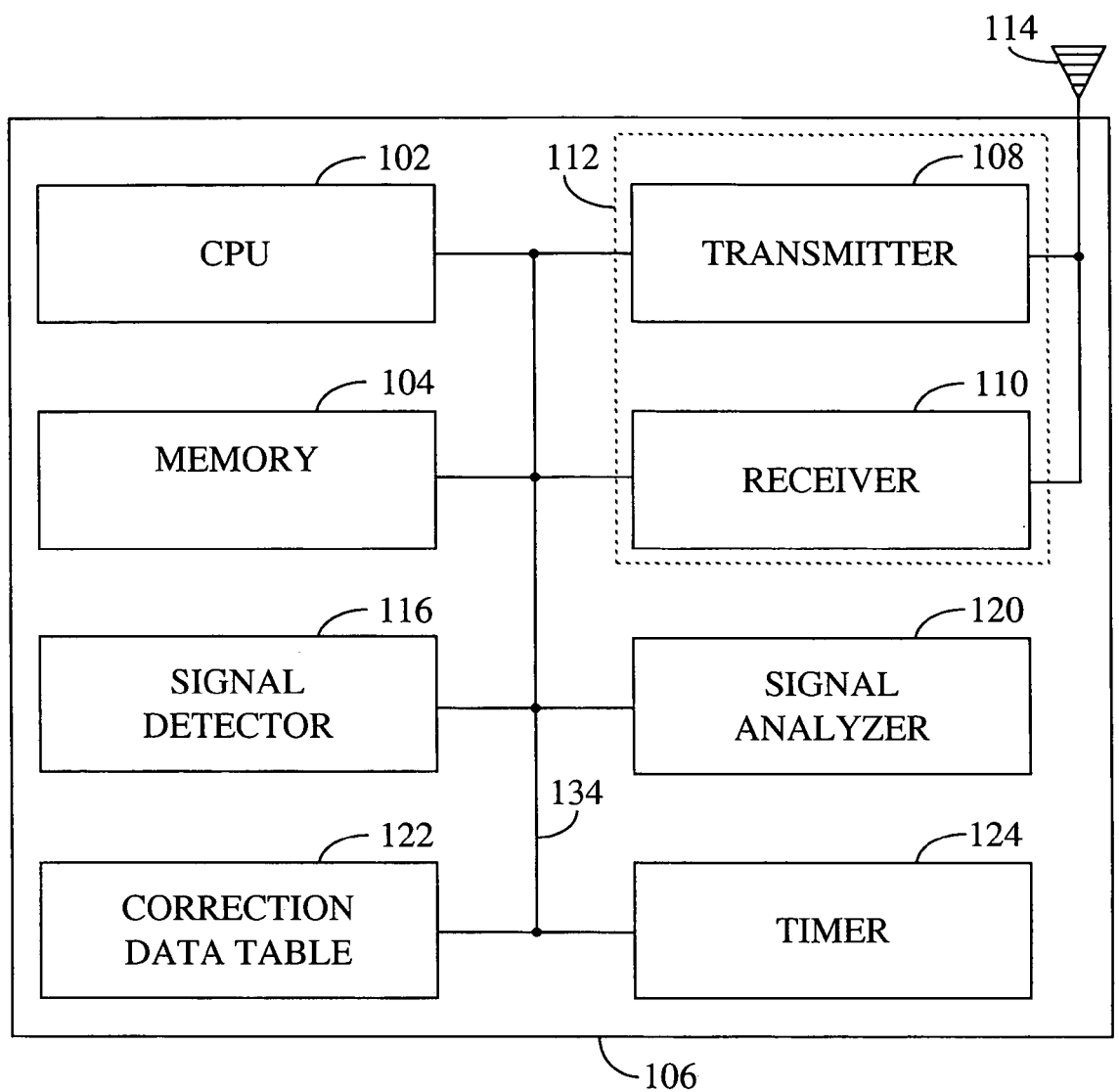
FIG. 2 is a functional block diagram of a system implementing the present invention.

The present invention is embodied in a system 100 illustrated in the functional block diagram of FIG. 2. The system 100 includes a central processing unit (CPU) 102, which controls operation of the system. Those skilled in the art will appreciate that the CPU 102 is intended to encompass any processing device capable of operating the telecommunication system. This includes microprocessors, embedded controllers, application specific integrated circuits (ASICs), digital signal processors (DSPs), state machines, dedicated discrete hardware, and the like. The present invention is not limited by the specific hardware component selected to implement the CPU 102.

The system also preferably includes a memory 104, which may include both read-only memory (ROM) and random access memory (RAM). The memory 104 provides instructions and data to the CPU 102. A portion of the memory 104 may also include non-volatile random access memory (NVRAM).

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a cell site controller (not shown). The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein except as it relates specifically to the present invention.

Figure 1:
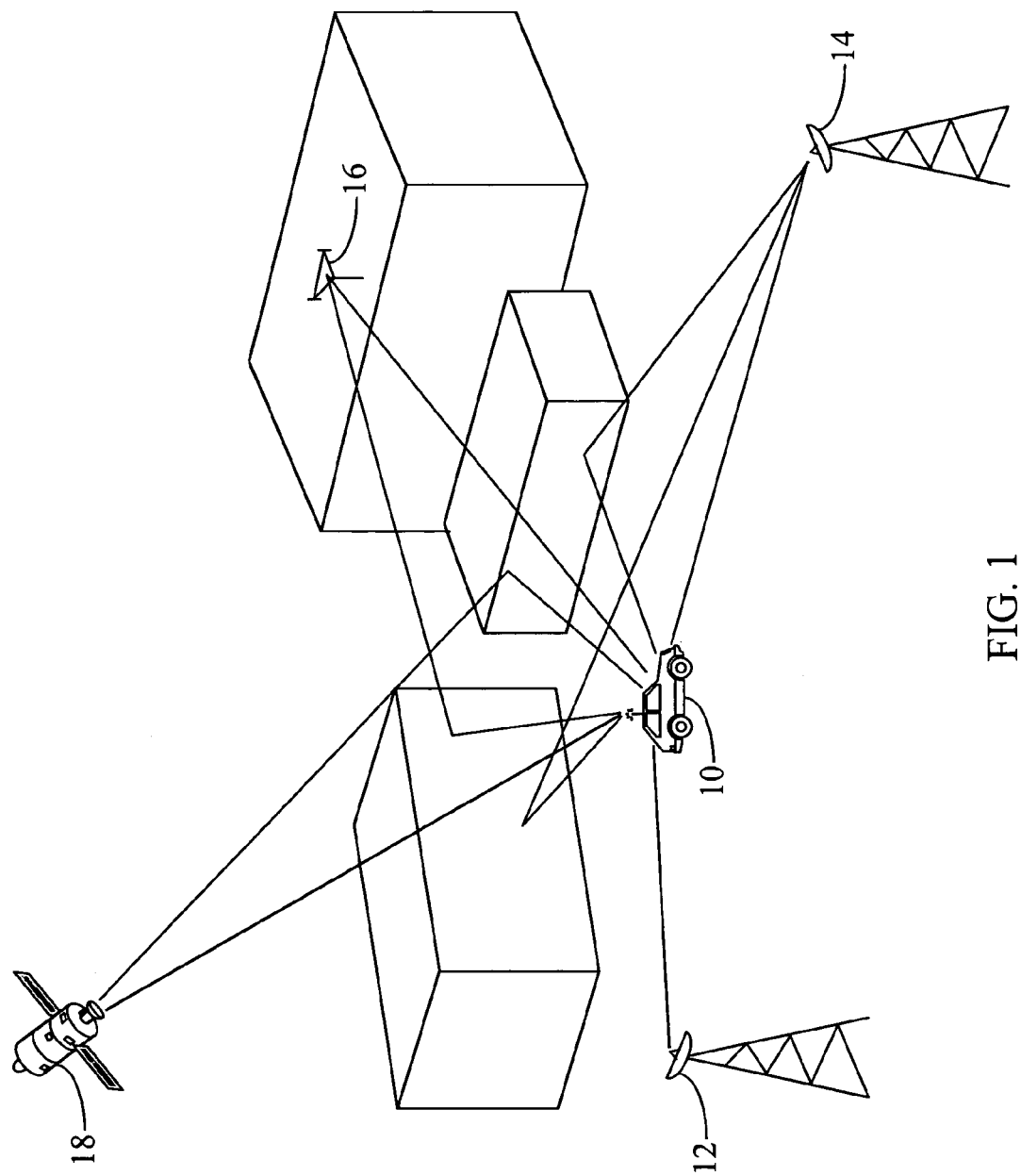
FIG. 1 illustrates multiple reception paths between transmission sources and a mobile unit.

In an implementation for a CDMA device, the system also includes a signal detector 116 used to detect and quantify the level of signals received by the transceiver 112. The signal detector 116 detects one or more parameters, such as a total energy, pilot energy per pseudo noise (PN) chip, power spectral density, and other parameters, as is known in the art. As will be described in greater detail, the signal detector 116 performs a correlation analysis to determine time of arrival (TOA) from a location, such as the transmitter 14 (see FIG. 1).

The signal detector 116 performs a correlation analysis between a reference signal and a received signal and generates a correlation output signal. A signal analyzer 120 analyzes the correlation signals and uses a correction data table 122 to generate distance correction data. In one embodiment, the correction data table 122 contains data relating the width of the correlation pulse to distance errors. However, other criteria may also be used to correct distance errors.

The system 100 includes a timer 124 to provide system timing that is used to measure delay times in the arrival of signals from different sources (e.g., the transmitters 12–16). The timer 124 may be a stand alone device or part of the CPU 102.

The various components of the system 100 are coupled together by a bus system 126, which may include a power bus, a control signal bus, and a status signal bus in addition to a data bus. However, for the sake of clarity the various buses are illustrated in FIG. 2 as the bus system 126. One skilled in the art will appreciate that the system 100 illustrated in FIG. 2 is a functional block diagram rather than a listing of specific components. For example, although the signal detector 116 and signal analyzer 120 are illustrated as two separate blocks within the system 100, they may be in fact embodied in one physical component, such as a digital signal processor (DSP). They may also reside as program codes in the memory 104, such code being operated on by the CPU 102. The same considerations may apply to other components listed in the system 100 of FIG. 2, such as the timer 124.

Figure 3:
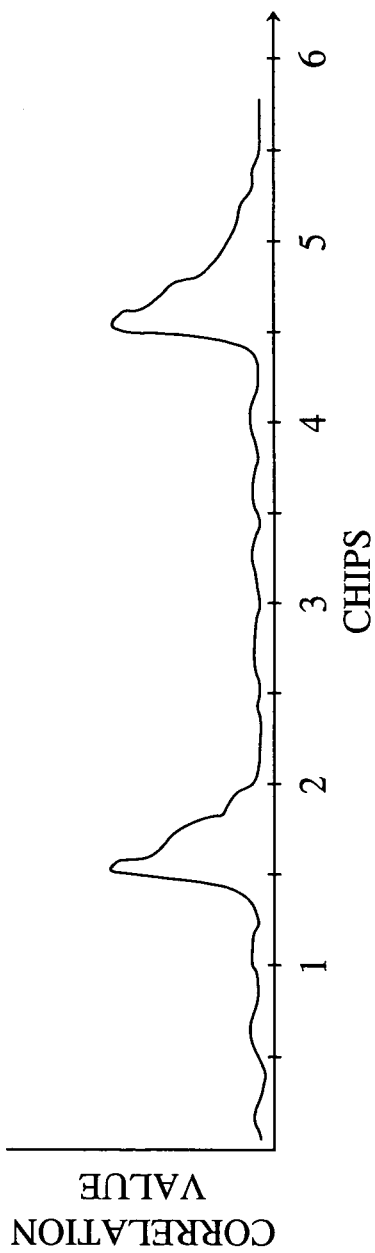
FIG. 3 are waveform diagrams illustrating the correlation signals generated by the system of FIG. 2.
Figure 3:
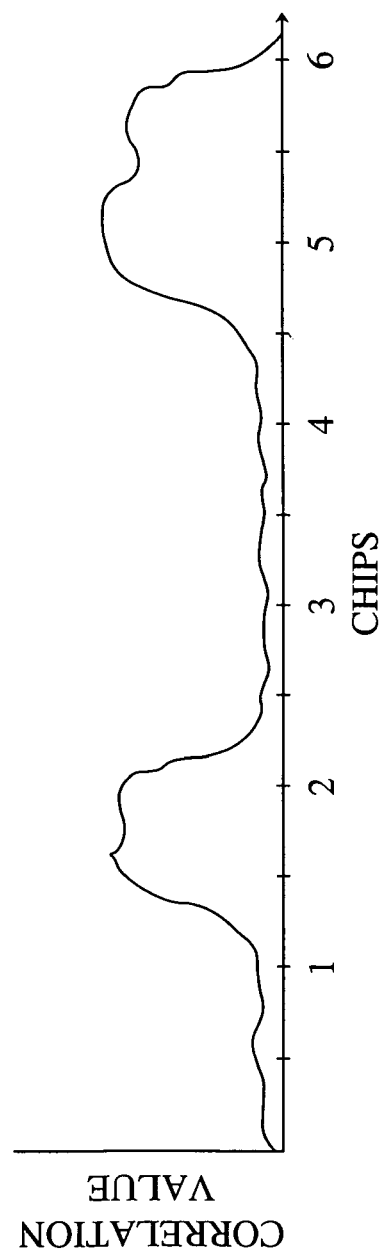

Operation of the components shown in the system 100 of FIG. 2 will be explained with reference to FIGS. 3–7. FIG. 3 is a series of waveform timing diagrams illustrating examples of the correlation pulses generated by the signal detector 116. To assist in proper understanding of the present invention, a brief description of time of arrival processing using, by way of example, a CDMA mobile unit, will be presented. A mobile unit (e.g., the mobile unit 10 in FIG. 1) implementing the system 100 of FIG. 2 is initially assigned a pseudo noise (PN) code. The PN code may be stored in the memory 104 as a local reference. When a base station (e.g., the transmitter 12) transmits data to the mobile unit 10, the base station transmits the PN code. The system 100 continuously searches for a correlation between the local reference (i.e., the stored PN code) and transmitted data (i.e., the transmitted PN code).

As is well known in the art, all the transmitters (e.g., the transmitters 12–16) transmit the same PN code, but the start of transmission of the PN code from each transmitter is delayed in time by a precisely known offset. The time offsets are measured in multiples of 64 chips. The PN offsets are selectively assigned to transmitters so that the offsets in a geographic region are spread out as much as possible to avoid interference between transmitters. The transmitters (e.g., the transmitters 12–16) may be identified by transmitted identification data, but are sometimes labeled by their PN offset time. For example, the transmitter 12 may be identified as PN 300 to indicate that it transmits the PN code at an offset of 300. In the present example, the transmitters 14 and 16 may be identified as PN 425 and PN 610, respectively, to indicate the offset times at which each will transmit the PN code. It should be understood, however, that regardless of how the transmitters are labeled, the relative offset of each with respect to each other can be established from the information encoded in the signals. The receiver 110 (see FIG. 2) in the mobile unit 10 will detect the PN from each of the transmitters in the geographic area (e.g., the transmitters 12–16).

If the mobile unit 10 were collocated with the transmitter 12, there would be no delay in transmission time between the transmitter and the system 100. In that case, the signal detector 116 (see FIG. 2) would immediately detect a correlation between the stored reference and the transmitted data. However, assuming that the mobile unit 10 is at some distance from the transmitter 12, there is a delay in the detection of such correlation due to propagation delays. The signal detector 116 shifts the stored reference one-half chip at a time until a correlation is detected between the stored reference and the transmitted data. As those skilled in the art will appreciate, a "chip" is a single piece of data in the PN sequence. Because the data is transmitted at a known rate, chips may be used as a measure of time. Although the present description may be characterized in actual units of time, it is more convenient to refer to the time in terms of chips because the system 100 performs its analysis and measurements in terms of chips.

The delay measurements may also be calculated as a distance since the propagation speed of the radio signals is known. Thus, measurements in delay time, distance and chips may all be made interchangeably.

If the propagation delay between the transmitter 12 and the mobile unit 10 were known, only two signals would be required to determine the precise location of the mobile unit. For example, it would be possible to draw a circle having a radius corresponding to the propagation delay (in meters) around the transmitter 12. The mobile unit 10 must be located somewhere on the circumference of that circle. The second detected PN code will be detected from the transmitter 14, which transmits the PN code at PN slot 425. The delay time to the generation of the correlation pulse from the second transmitter (i.e., the transmitter 14) would allow the measurement of a second propagation delay time. A circle surrounding the transmitter 14 having a radius corresponding to the second propagation delay indicates that the mobile unit 10 must be located somewhere on that circumference. With two known propagation delays, the mobile unit 10 must be located at the intersection of the two circles.

However, the propagation delay between the transmitter 12 and the mobile unit 10 is unknown. Therefore, the system 100 arbitrarily assigns an arbitrary reference of zero delay to the first received PN code. Thus, the first received signal is not directly involved in the location measurement. The reception of signals from two subsequent transmitters (e.g., the transmitters 14 and 16) have delays with respect to the transmitter 12 that are the result of the PN offset and the propagation delay due to the distance between the mobile unit 10 and the transmitters 14 and 16, respectively. The delay in the generation of the correlation pulse due to the PN offset in transmission of the PN code can be readily determined and appropriate compensation made in the timing. However, the time difference of arrival between the transmission of the PN code and the generation of the correlation pulse is due to the propagation delays and, therefore, the distance between the mobile unit 10 and the respective transmitter (e.g., the transmitters 14 and 16). The location of the mobile unit 10 can be determined based on the precise TOA of the signals from the transmitters 14 and 16. Accordingly, the system 100 requires reception of the PN code from three different transmitters. The first correlation pulse is used as a zero reference while the excess delay times associated with the remaining two transmitters (e.g., the transmitters 14 and 16) are used to provide the appropriate delay measurements.

Waveform (A) in FIG. 3 shows a sample correlation output generated by the signal detector 116 (see FIG. 2) in the absence of any multipath signals. The signal detector 116 shifts the reference data (i.e., the stored PN) one-half chip at a time until it detects a correlation between the reference data and the received data. The correlation pulse generated as a result of the PN code from the transmitter 12 is not shown because it is used as the arbitrary zero reference. The delay caused by PN offset of the transmitters 14 and 16 has also been eliminated so that the waveforms of FIG. 3 only show the effects of the propagation delay. In the example illustrated in waveform (A), the correlation pulse due to the transmitter 14 is generated at approximately 1.5 chips from the arbitrary zero reference. The 1.5 chip delay is related to the distance between the transmitter 14 and the mobile unit 10. Thus, the time of arrival may be determined by the delay as measured in chips (or in meters, if desired).

The data transmitted from the transmitter 14 also includes identification data such that the mobile unit 10 implementing the system 100 can identify the transmitter 14 as the source of the correlation signal detected at 1.5 chips. In addition to the transmitter 14, the mobile unit 10 implementing the system 100 will receive data from the transmitter 16. The signal detector 116 will detect a correlation between the local reference (i.e., the stored PN code) and the transmitted data from the transmitter 16. In the example illustrated in waveform (A), the correlation signal due to the PN code from the transmitter 16 is detected at approximately 4.5 chips from the zero reference. The 4.5 chip delay is related to the difference between the distance from the transmitter 16 to the mobile unit 10 and the distance from the transmitter 12 to the mobile unit 10. This can be understood by the following example illustrated in FIG. 3c. The signal generated by the transmitter 12 is delayed by 400 chips with respect to the signal generated by transmitter 14. There is a 15 chip delay from the time the signal transmitted by transmitter 12 is generated and the time that signal is received by the mobile unit 10. Likewise, there is a 5 chip delay from the time the signal generated by the transmitter 14 is generated and the time that signal is received by the mobile unit 10 due to the propagation delay between the transmitter 14 and the mobile unit 10. Therefore, the delay that is perceived at the mobile unit 10 between receipt of the signal generated at the transmitter 12 and the signal generated at the transmitter 14 will be a total of 410 chips. This 410 chips is the difference between the 415 chip delay from the time the signal was generated at the transmitter 12 and the 5 chip delay in the reception of the signal generated by the transmitter 14. As noted above, the data transmitted from the transmitter 16 also includes identification data such that the mobile unit 10 implementing the system 100 can identify the transmitter 12 as the source of the correlation peak detected at 4.5 chips.

In addition, the mobile unit 10 implementing the system 100 may detect pulses from additional base station transmitters (not shown) or from satellites using global positioning system (GPS) signals. As is known in the art, GPS also uses time of arrival data in order to determine the location of the mobile unit 10. In an exemplary embodiment, the mobile unit 10 determines time of arrival data from three or more different transmitters. As noted above, the first correlation pulse is used as a zero reference while the relative delay times of the additional correlation pulses are used to determine the location of the mobile unit 10 based on the time of arrival of the additional correlation pulses. In the absence of any multipath effects, the pulses illustrated in waveform (A) provide a relatively accurate measure of time of arrival and thus can be used to accurately determine the location of the mobile unit 10.

Under current telecommunication standards, such as IS-801, the CDMA standard for position location, the mobile unit 10 may be capable of performing calculations using TOA data to determine its location. However, the location of the mobile unit 10 may be determined by portions of the fixed infrastructure as well. In this embodiment, the mobile unit transmits identification data and delay measurement data to a remote location, such as the transmitter 14. A position determining entity (PDE) associated with the transmitter 14 performs the calculations and determines the location of the mobile unit 10 based on the known locations of the various transmitters and the delay data measured from each transmitter. Table 1 below illustrates sample data transmitted from the mobile unit 10 to the PDE associated with the transmitter 14:

TABLE 1

| PN Offset | DELAY (in meters) |
|---|---|
| 300 | 0 |
| 425 | 1,500 |
| 610 | 4,500 |

As known in the art, and discussed briefly above, the PN value for each of the transmitters (e.g., the transmitters 12–16) refers to the PN offset at which each transmitter begins to transmit the PN code. In the example illustrated in Table 1, the excess delay (i.e., the delay not attributed to the PN offsets) is calculated in chips and converted to a delay in meters. For waveform (A) in FIG. 3, the two correlation pulses from the transmitters (e.g., the transmitters 14 and 16) resulted in correlation pulses at 1.5 and 4.5 chips, respectively. The data in Table 1 includes the PN offsets associated with each of the transmitters and the relative excess delay time based on the delay in the time of arrival of pulses.

The PDE uses the identification code to determine which transmitters are associated with each excess delay time. Since the location of the transmitters are all known, it is a relatively simple calculation to determine the location of the mobile unit 10 based on the delays from each of the respective transmitters. This calculation process is known in the art and need not be described herein.

Unfortunately, multipath effects are present in almost all TOA measurements. Although satellite signals using GPS location technology tend to have less multipath effects, these effects are still present. Multipath effects from GPS satellites (e.g., the GPS satellite 18) are particularly prevalent in urban areas where buildings and other man-made structures interfere with the GPS signal. Terrestrial systems, such as the transmitters 12–16 (see FIG. 1) are also effected by manmade structures such that signals are defracted and/or reflected. As a result, the mobile unit 10 receives multiple images of the same signal. The system 100 is capable of estimating the error resulting from multipath effects. These multipath effects may be termed "short multipath effects" because the multiple signals generally are delayed only a small amount of time and may arrive at the antenna 114 (see FIG. 2) of the system 100 such that the respective times of arrival are too close to produce different peaks in the overall correlation function. That is, the signals arrive within such a short period of time that the output from the signal detector 116 is a single distorted pulse that results from the overlapping effects of the multiple detected signals.

In the previous example discussed with respect to waveform (A) of FIG. 3, the mobile unit 10 receives a single signal from the transmitter 14 and the transmitter 16 with no multipath signals. The effect of the multiple signals is illustrated in waveform (B) of FIG. 3 where the signal detector 116 shows a correlation value with a much broader pulse width as a result of multiple receptions of the same signal within a short period of time. Instead of a relatively narrow pulse at 1.5 chips, as shown in waveform (A), the signal detector 116 generates a broad pulse making it difficult to accurately determine the time of arrival because systems are designed to detect the peak signal. In waveform (B), the signal has a peak between 1.5–2.5 chips. Similarly, the correlation value resulting from signals received from the transmitter 16 are also illustrated in waveform (B) of FIG. 3. Again, the multipath effects cause a broadening of the pulse such that the peak is between 4.5–5.5 chips.

It should be noted that the effects illustrated in waveforms (A) and (B) of FIG. 3 are illustrative only. Multipath effects may result in signals arriving out of phase at the antenna 114 (see FIG. 2) such that the signal detector 116 generates multiple peaks associated with a single signal. The present invention provides at least partial compensation for the errors that result from multipath effects. The compensation system described herein is not limited to the waveform shapes or excess delay times illustrated in FIG. 3.

Figure 4:
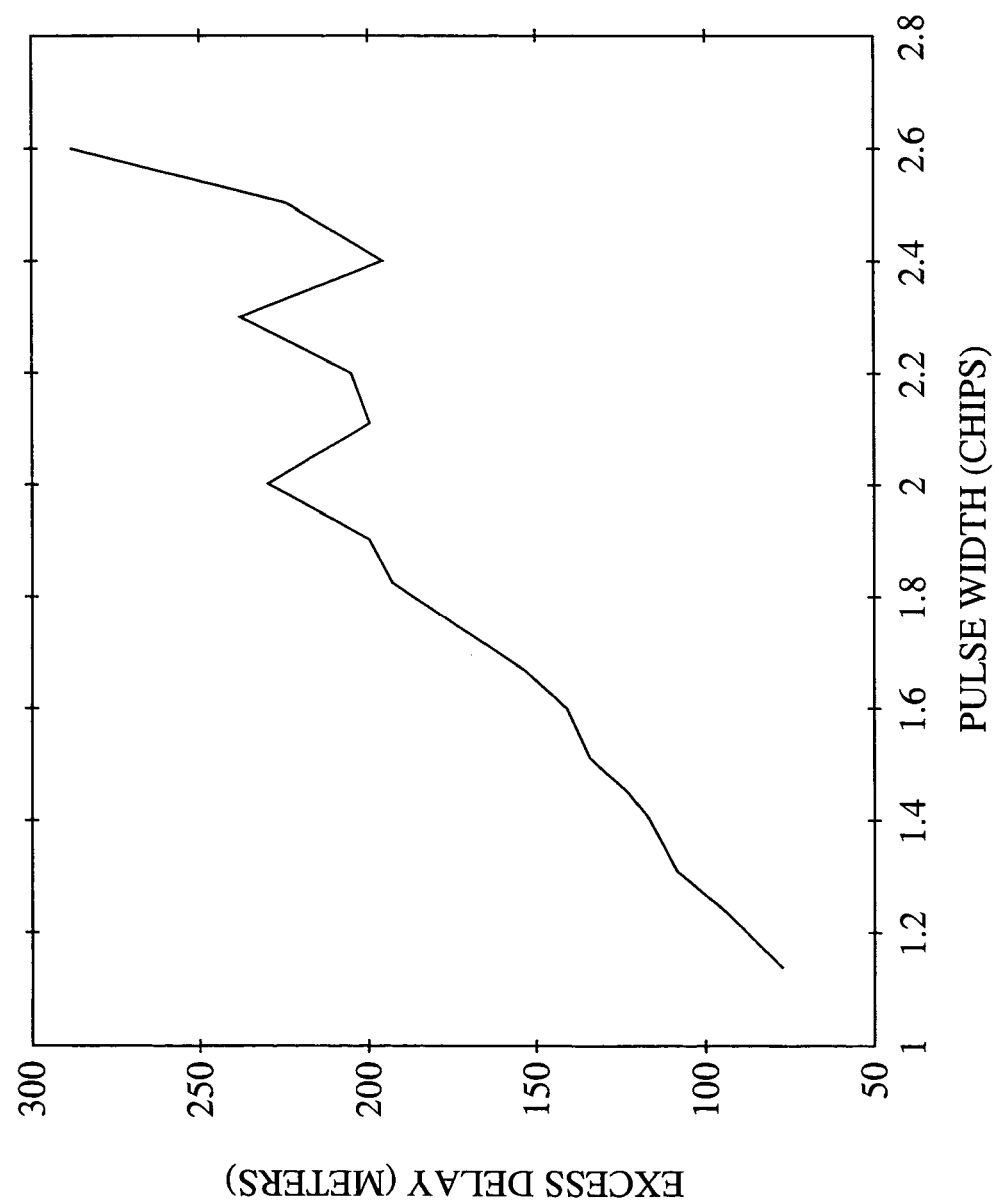
FIG. 4 is a graph illustrating a functional relationship between correlation peak width and distance errors.

It has been determined that a functional relationship exists between the width (W) of the correlation pulses generated by the signal detector 116 and the amount of error in the time of arrival measurements. That is, the width of the correlation pulse generated by the signal detector 116 can be functionally related to the amount of error in the time of arrival signal due to multipath effects. The functional relationship between the pulse width W and the delay error may be characterized by a function $f(W)$. FIG. 4 illustrates the function $f(W)$ based on field experiments where actual measured distances were compared with distances calculated by the conventional time of arrival techniques. It should be noted that the jaggedness of the curve for pulse widths greater than 2 chips may be the result of relatively few sample values for widths greater than 2. However, the graph of FIG. 4 clearly shows a relationship between pulse width and delay error.

The signal analyzer 120 (see FIG. 2) calculates the width W of the correlation pulse generated by the signal detector 116 and applies the function $f(W)$ to determine the amount of error in the TOA measurement.

Although there are a number of different techniques by which one can measure the width of the correlation pulse, one example is described herein. The system 100 models the correlation pulses as a quadratic equation and utilizes three measurement values to determine the coefficients of the quadratic equation. The three measurement values are data points selected from the correlation pulse and include the data point having the maximum value and a data point on either side of that maximum value. This is illustrated in Equation (1) below:

$$v = [y(-1), y(0), y(1)] \quad (1)$$

where v are the values of the maximum of the correlation function (y(k)) and its two neighbors. The quadratic function is represented below where:

$$y(x) = ax^2 + bx + c \quad (2)$$

which is a conventional quadratic equation having coefficients a, b, and c, y is the amplitude of the correlation pulse, and x is the time (as measured in chips in the present example).

It is possible to calculate the values for the coefficients a, b, and c using linear equations and substitution of the different values for x into Equation (2) as represented by Equation (3) below:

$$[a, b, c]' = \begin{bmatrix} 1 & -1 & 1 \\ 0 & 0 & 1 \\ 1 & 1 & 1 \end{bmatrix}^{-1} * v' \quad (3)$$

where the value of y at each of the data points x=-1,0,1 is measured and the values of the coefficients a, b, and c are determined using the matrix of Equation (3). The pulse width W can now be determined. For consistency of measurement, the system 100 computes the width of the correlation pulse at a distance D down from the peak value. This is represented in Equation (4) below:

$$ax^2 + bx + c = \max * D \quad (4)$$

where max is the maximum value of the pulse and D is a predetermined percentage of the maximum value. In one embodiment, the pulse width measurement is performed for a value of D=0.01. That is, the correlation pulse width W is determined at the point where y=0.01 times the maximum value. In a logarithmic scale, this corresponds to the width of the pulse at a point 20 decibels (dB) down (i.e., -20 dB) from the peak value. The value of -20 dB was selected to produce consistent results. However, those skilled in the art will recognize that other values may be satisfactorily used with the system 100. The present invention is not limited by the specific technique by which the correlation pulse width is measured.

The correlation pulse width W may be represented by Equation (5) below:

$$W = \frac{\sqrt{b^2 - 4a(c - D)}}{a} \quad (5)$$

where all terms have been previously defined.

The system 100 implements the function f(W) in the form of the correction data table 122 (see FIG. 2). The correction data table 122 may be a stand-alone device or part of the memory 104. The correction data table 122 may be readily implemented using any convenient form of data structure. Numerous data structures are known in the art and can be satisfactorily used. The specific form of the data structure is not critical to satisfactory implementation of the correction data table 122. Generally, the pulse width W is entered as a data value to the correction data table 122 and the delay error is generated as an output from the correction data table 122.

In other implementations, the function f(W) may be implemented as a mathematical function rather than implementation using the correction data table 122. A mathematical equation may be readily derived and the value for the pulse width W inserted therein as a variable. In this embodiment, the mathematical equation is stored in a data structure, such as the memory 104.

Based on the field measurements discussed above, it has been found that the number of measurements with an error of less than 100 meters was increased by 10% after applying the correction factor from the correction data table 122. Thus, the system 100 can demonstrably improve the accuracy of location technology in the presence of multipath signals.

As previously noted, the current CDMA standard for position location, IS-801, provides for the location measurement to be performed by the mobile unit or by a PDE associated with the infrastructure (e.g., the transmitter 14). In the latter implementation, the current CDMA standard (i.e., IS-801) includes no provision for transmitting the value of the pulse width W to the PDE associated with, by way of example, the transmitter 14 (see FIG. 1). Accordingly, in an exemplary embodiment, the system 100 subtracts the correction value from the calculated TOA delay distance to thereby provide compensation in the data transmitted back to the PDE. Using the example of Table 1 above, where 3 transmitter PN offset numbers and distance measurements were determined, the signal analyzer 120 calculates the correction factor (i.e., the delay error) for each measurement based on the pulse width W associated with each transmitter. For example, the first correlation pulse shown in waveform (B) of FIG. 3 is approximately 1.3 chips in width. This corresponds to an error of approximately 100 meters using the function f(W) illustrated in FIG. 4. The signal analyzer 120 automatically subtracts 100 meters from the distance value calculated based on the uncorrected time of arrival. For example, PN 425 with the delay of 1,500 meters would be corrected to 1,400 meters because the corresponding pulse width W is 1.3 chips. The signal analyzer 120 automatically adjusts each delay using the pulse width W, as described above and transmits corrected data to the PDE associated with the transmitter 14. Thus, the PDE receives data for which compensations have already been made to account for the effects of multipath transmissions.

In another embodiment, the mobile unit itself may be the PDE. In this event, the signal analyzer 120 automatically adjusts the delays in the manner described above and calculates the distances using known geometric calculations to determine the distance between the system 100 and the various transmitters (e.g., the transmitters 12–16). In this embodiment, the system 100 must be provided information relating the location of the various transmitters and their identification data to permit the PN codes to be associated with the correct transmitter. In yet another embodiment, the pulse width data may be transmitted directly to the PDE associated with, by way of example, the transmitter 14, to permit the PDE to perform the compensation adjustments prior to calculating the location of the mobile unit. Thus, the system 100 is not limited by the location of the PDE or the type of data provided to the PDE. For example, the PDE associated with the transmitter 14 can be provided with the pulse width data or provided with delay data that has already been compensated for the effects of multipath signals.

Figure 5:
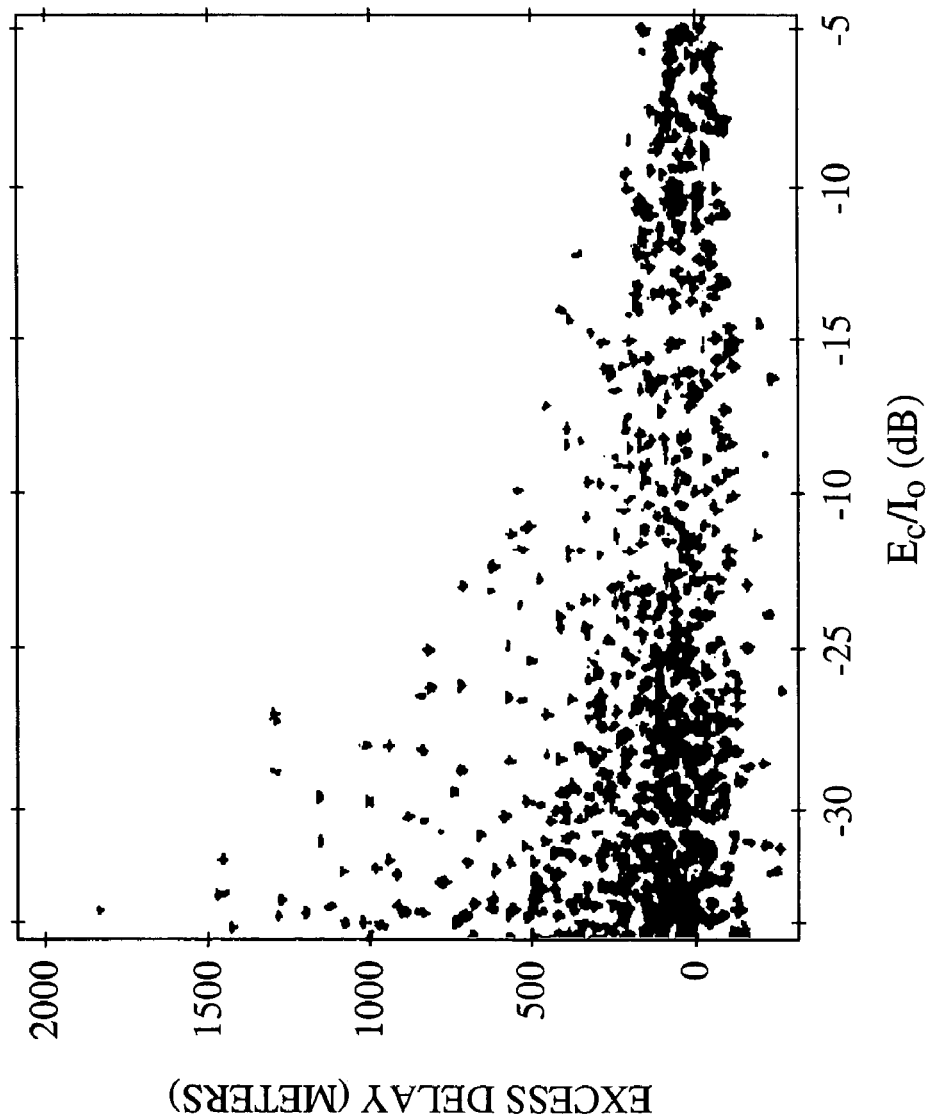
FIG. 5 is a graph illustrating a functional relationship between a power measurement and distance errors.

In yet another alternative embodiment, other measures may be used to compensate for multipath effects. For example, it can be demonstrated that signal strength also has a functional relationship with delay error. In this embodiment, the signal analyzer 120 receives a pilot strength indicator ($E_c/I_o$) from the signal detector 116. The pilot strength signal indicator is a measure of the pilot energy per PN chip ($E_c$) divided by the total power spectral density received by the receiver 110 ($I_o$). FIG. 5 is a plot of excess delay versus pilot signal strength. As can be noted from the chart of FIG. 5, lower pilot strength signal is sometimes indicative of excess delays (i.e., errors). Accordingly, a function can be developed relating the excess delay to pilot signal strength. This data may be stored in the form of the correction data table 122 (see FIG. 2) and utilized in the manner previously described. Alternatively, a mathematical function may be stored in the system 100 and processed by the signal analyzer 120. In yet another embodiment, a combination of selection criteria may be used to determine the excess delay. For example, a combination of the pulse width W and the pilot strength indicator ($E_c/I_o$) may be used to determine excess delay.

Figure 6:
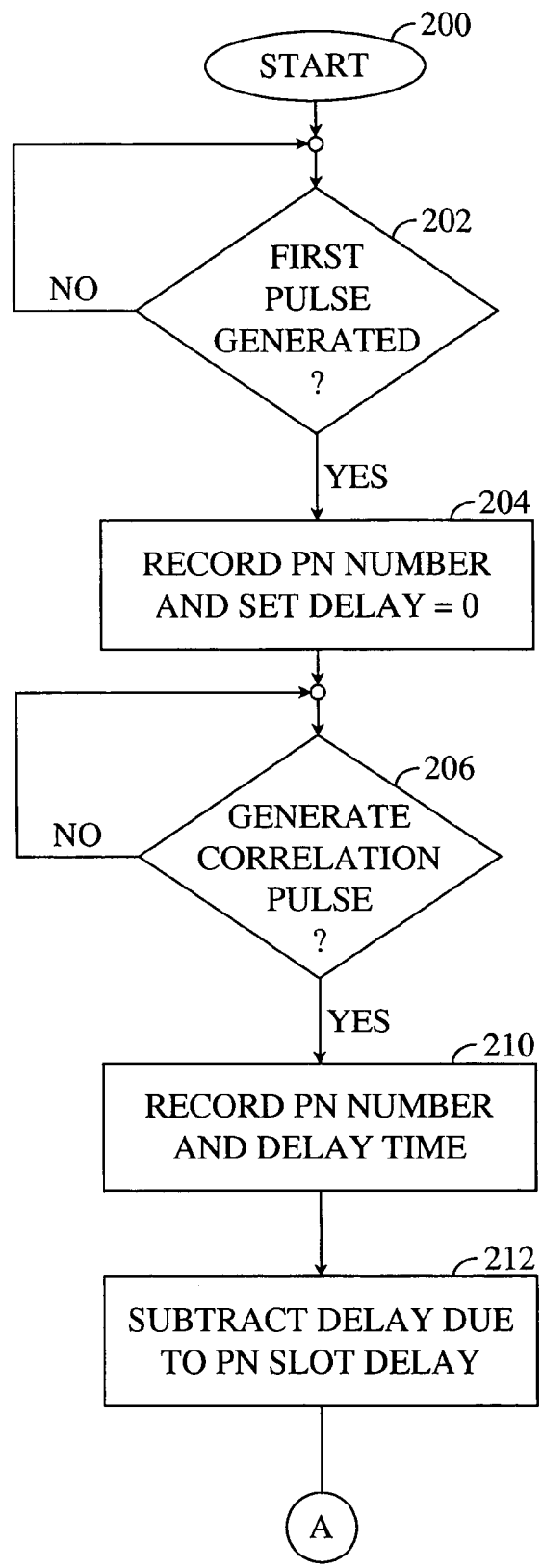
FIGS. 6 and 7 together form a flowchart illustrating the operation of the invention.
Figure 7:
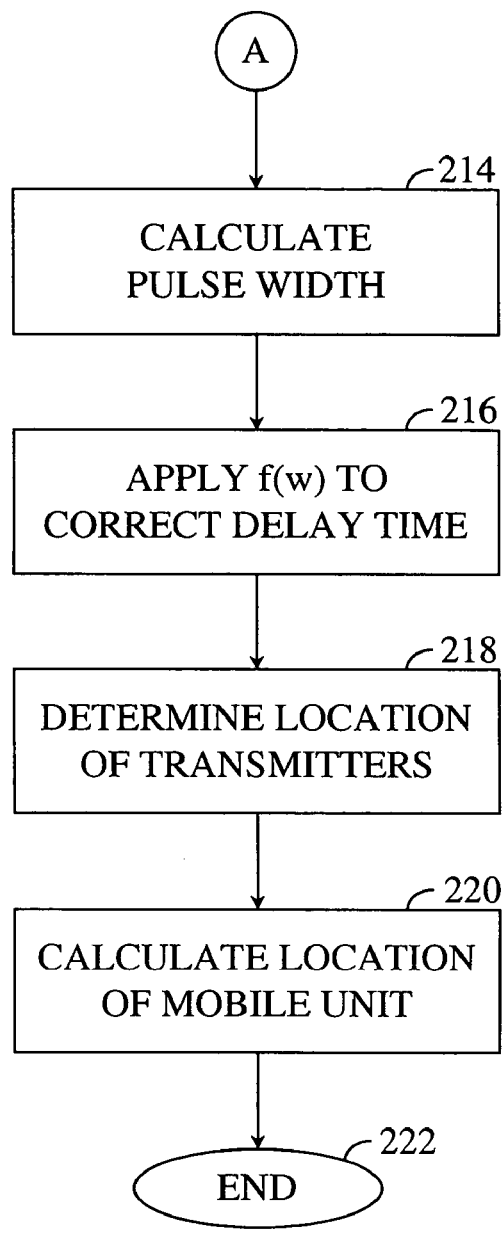

The operation of the system 100 is illustrated in the flowcharts of FIGS. 6 and 7. At a start 200, the system 100 is under power and is capable of receiving data from transmitters, such as the transmitters 12–16. In decision 202, the system 100 determines whether a first correlation pulse is generated by the signal detector 116. As is known in the art, and described briefly above, the signal detector 116 is part of a conventional CDMA mobile unit that searches for the transmitted PN code. When the PN code is detected, the signal detector 116 generates the correlation pulse. If no pulse is detected, the result of decision 202 is NO and the system returns to decision 202 to await the detection of a correlation pulse. When the first PN code is detected, and the first correlation pulse generated, the result of decision 202 is YES and, in step 204, the system records the PN number associated with the transmitter and sets the delay time to zero. In decision 206, the system 100 awaits the detection of PN codes from additional transmitters. If no additional correlation pulses are generated, the result of decision 206 is NO and the system returns to position 206 to await the detection of the PN code from additional transmitters. When the PN code from additional transmitters (e.g., the transmitters 14 and 16) are detected, the signal detector 116 generates correlation pulse and the result of decision 206 is YES.

Each time the correlation pulse is generated, the system 100 records the PN number in step 210 and the delay time in the generation of the correlation pulse. In step 212, the system 100 subtracts the delay due to the PN time slot delay. The remaining delay is attributable only to the propagation delay. As previously noted, the system 100 must detect the PN code from at least three different transmitters. This can be a combination of terrestrial transmitters (e.g., the transmitters 12–16) or may include one or more GPS satellites (not shown). Thus, decision 206 and steps 210 and 212 will be repeated such that the system 100 has three PN numbers and associated delay times. In step 214, illustrated in FIG. 7, the system 100 calculates the pulse width W of the correlation pulses generated by the signal detector 116. In step 216, the system 100 applies $f(W)$ to correct the delay time. As previously noted, the system 100 may directly apply a mathematical $f(W)$ to calculate a delay time. Alternatively, the system 100 may use the correction data table 122 to look up a correction factor for the delay time based on the pulse width W. Alternatively, steps 214 and 216 may be replaced with a calculation of the signal strength, such as ($E_c/I_o$) from the signal detector 116 and apply a function f of ($E_c/I_o$) to correct the delay time. Still other measures, such as the RMS signal strength, or other criteria, may also be used if there is a correlation between the selected criteria and the delay time error caused by multipath effects.

Whichever correction approach is taken, the function is applied to the measured delay times to generate corrected delay times in step 216. In step 218, the system 100 determines the location of the transmitters for which corrected delay times have been calculated. In step 220, the PDE calculates the location of the mobile unit 10 and ends the process at 222 with the location of the mobile unit having been determined. The increased accuracy of location determination is due to the decrease in the adverse impact of multipath effects.

As previously noted, the PDE may be implemented within the mobile unit itself provided that the mobile unit is given the precise location of the various transmitters. Under current telecommunication standards, this information is not provided to the mobile units, but is provided to the various base stations. If the PDE is associated with a base station (e.g., the transmitter 12), the mobile unit transmits the detected PN numbers and delay times to the PDE associated with the transmitter 12. The delay times may include the measured delay times and correction factors, or may include the corrected delay times only. In yet another alternative embodiment, the system 100 may transmit the measured pulse widths to the PDE associated with, by way of example, the transmitter 12 to allow the calculation of correction factors within the PDE. The present invention is not limited by the location at which the correction factors are calculated and applied to the measured delay times nor is it limited to the location of the PDE.

Thus, the system 100 provides a technique by which the effective multipath errors may be diminished, thus allowing a more accurate determination of the location of the mobile unit 10. Such increased accuracy can be critical in locating the mobile unit if emergency services are required by the user.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the correction of multipath errors in a telecommunications device, the system comprising:
   an antenna capable of detecting telecommunications signals and generating detected electrical signals as a result thereof;
   a receiver coupled to the antenna to receive the detected electrical signals;
   an energy detector to analyze the received signals and to generate a correlation pulse when the received signals match a stored reference signal;
   a timer to determine a time of arrival of the correlation pulse; and
   an analyzer to calculate a pulse width of the correlation pulse and to apply a correction factor to the time of arrival based on the pulse width to generate a corrected time of arrival.

2. The system of claim 1 wherein the analyzer converts the time of arrival into a delay time and the correction factor is a time delay correction factor applied to the delay time.

3. The system of claim 1 wherein the analyzer converts the time of arrival into a distance measurement and the correction factor is a distance delay correction factor applied to the distance measurement.

4. The system of claim 1, further comprising a data structure to store data relating a plurality of pulse width values to correction factors wherein the analyzer provides a measured pulse width value as an input to the data structure and retrieves a correction factor stored in association with the measured pulse width value.

5. The system of claim 1, further comprising a data structure to store a mathematical function relating pulse width to correction factors wherein the analyzer calculates the correction factor using the pulse width and the mathematical function.

6. The system of claim 1, further comprising a positioning determining entity to determine the location of the receiver based on the corrected time of arrival and a known location of the remote transmitter.

7. The system of claim 1 wherein the analyzer models the correlation pulse as a quadratic equation having a plurality of coefficients, the coefficients being determined by amplitude values of the correlation pulse at predetermined times.

8. The system of claim 1 wherein the analyzer calculates a maximum amplitude of the correlation pulse and measures the pulse width at a predetermined level below the maximum amplitude.

9. The system of claim 1 wherein the receiver generates a signal strength indicator.

10. The system of claim 1 wherein the receiver is a portion of a cellular telephone operating in an 800 MHz band and the analyzer calculates the location data based on a time of arrival of data transmitted from the remote transmitter in the 800 MHz band.

11. The system of claim 1 wherein the receiver is a portion of a personal communication system telephone operating in an 1900 MHz band and the analyzer calculates the location data based on a time of arrival of data transmitted from the remote transmitter in the 1900 MHz band.

12. The system of claim 1 wherein the remote transmitter is a global positioning system (GPS) satellite and the receiver receives the data signals from the GPS satellite, the analyzer calculating the location data based on a time of arrival of data transmitted from the GPS satellite.

13. The system of claim 1 wherein the receiver is a portion of a code division multiple access CDMA) telephone and the analyzer calculates the location data based on a time of arrival of data transmitted from the remote transmitter in the 800 MHz band.

* * * * *